(12) United States Patent
Rome

(10) Patent No.: US 8,176,599 B2
(45) Date of Patent: May 15, 2012

(54) CINCHING AND BUNDLING TIE

(76) Inventor: Partick Rome, El Paso, TX (US)

(*) Notice: Subject to any disclaimer, the term of this patent is extended or adjusted under 35 U.S.C. 154(b) by 138 days.

(21) Appl. No.: 12/714,857

(22) Filed: Mar. 1, 2010

(65) Prior Publication Data

US 2010/0146743 A1    Jun. 17, 2010

Related U.S. Application Data

(63) Continuation-in-part of application No. 11/704,572, filed on Feb. 9, 2007, now abandoned.

(60) Provisional application No. 60/773,360, filed on Feb. 14, 2006.

(51) Int. Cl.
*A44B 6/00* (2006.01)

(52) U.S. Cl. .......... 24/1; 24/17 A; 24/17 AP; 24/16 PB; 24/712.1; 24/713

(58) Field of Classification Search .......... None
See application file for complete search history.

(56) References Cited

U.S. PATENT DOCUMENTS

| | | | | |
|---|---|---|---|---|
| 3,438,095 | A | * | 4/1969 | Evans .......... 24/16 PB |
| 3,486,200 | A | | 12/1969 | Orenick |
| 3,780,401 | A | | 12/1973 | Reimer |
| 3,833,972 | A | | 9/1974 | Brumlik |
| 3,914,823 | A | * | 10/1975 | Hara .......... 24/16 PB |
| 3,918,129 | A | | 11/1975 | Hara |
| 3,943,607 | A | | 3/1976 | Hara |
| 4,466,159 | A | | 8/1984 | Burrage |
| 5,799,376 | A | | 9/1998 | Harsley |
| D631,328 | S | * | 1/2011 | Chen .......... D8/356 |

* cited by examiner

*Primary Examiner* — Jack W. Lavinder
(74) *Attorney, Agent, or Firm* — Tuesday A. Kaasch; Luis M. Ortiz; Kermit D. Lopez

(57) ABSTRACT

A cinching and bundling tie consisting of a planar strap having multiple teeth along both edges that engage when the strap is tied around an object or objects. The tie is self engaging, re-usable, simple in design, effective in its performance, easy to use, quick to apply, and adjustable.

3 Claims, 4 Drawing Sheets

CINCHING AND BUNDLING TIE

CROSS-REFERENCE TO RELATED DOCUMENTS

The present invention is a continuation in part of a U.S. patent application Ser. No. 11/704,572, entitled "Cinching and Bundling Strap" filed on Feb. 9, 2007 now abandoned, the disclosure of which is incorporated herein in its entirety by reference. The parent case filed on Feb. 9, 2007 claimed priority to provisional application Ser. No. 60/773,360 filed on Feb. 14, 2006, and incorporates all disclosure of that provisional application. The present application therefore claims priority to both of the applications described above in this paragraph.

FIELD OF THE INVENTION

Embodiments are generally related a unique re-useable, self locking, cinching and bundling tie. Embodiments are also generally related to a planar tie manufactured using die cutting techniques.

BACKGROUND OF THE INVENTION

There are many examples of self locking straps or ties existing in the prior art used for a multitude of purposes, such as bundling of wire, cord, tubing, as well as bag closure and even the hanging of Christmas lights. One such example is U.S. Pat. No. 6,763,554, issued to Torrey et al., which describes many types of ties or wraps, including those which utilize Velcro®. In addition to the foregoing, U.S. Pat. No. 3,833,972, issued to Brumlick, discloses a tie with teeth or slots which open and catch onto the material being bundled. U.S. Pat. Nos. 3,914,823 and 3,943,607, issued to Hara, describe a strap which interlocks with teeth. U.S. Pat. No. 3,918,129, issued to Hara, discloses a strap with one side having engaging hooks while the other side contains teeth which are to be engaged with the afore referenced hooks. U.S. Pat. Nos. 4,466,159, issued to Burrage, 3,486,200, issued to Orenick, and 5,799,376, issued to Harsley, each disclose a strap which is inserted through a hole. U.S. Pat. No. 3,780,401, issued to Reimer, describes a strap with extending hooks which engage the body of the strap.

There exists a need for a cinching and bundling tie that can be manufactured from a wide variety of materials utilizing die cutting techniques with minimal waste. There also exists a need for a cinching tie that is easily engaged to provide a secure hold and can be cinched and un-cinched multiple times without loss of effectiveness or structure.

SUMMARY OF THE INVENTION

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is one aspect of the present invention to provide a cinching and bundling tie consisting of a strap having multiple teeth along both edges. The tie is self engaging, re-usable, simple in design, effective in its performance, easy to use, quick to apply, and adjustable. Other objects and advantages of the present invention will become apparent from the following detailed description when viewed in conjunction with the accompanying drawings, which set forth certain embodiments of the invention.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

It is to be understood by persons of ordinary skill in the art that the following descriptions are provided for purposes of illustration and not for limitation. An artisan understands there are many variations that lie within the spirit of the invention and the scope of the appended claims. Unnecessary detail of known functions and operations may be omitted from the current description so as not to obscure the present invention.

Patrick Rome, the inventor in connection with the invention described herein, owns and operates a business which is involved in the manufacture of carrier tape used with surface mount technology ("SMT"). Surface mount technology is a method for constructing electronic circuits in which the components are mounted directly onto the surface of the printed circuit board ("PCB"). Electronic components such as resistors, capacitors, inductors, and semiconductors, utilized in connection with SMT are referred to as surface mount devices ("SMD"). The preferred method of supplying SMD's today is tape and reel. Tape and reel is a process of loading SMD's into individual pockets contained on what is known as pocket or carrier tape. The carrier tape typically has holes along one edge which align with the handling requirements of the component delivery system. SMD's are added to the blank carrier tape and the components sealed with a cover tape. The carrier tape, which now contains the required SMD's, is wound around a reel for convenient handling and transport.

Quite unexpectedly, it was discovered that if two pieces of blank carrier tape were twisted around each other, they formed a tight, self locking, re-usable cinch. Unfortunately, the material used for the carrier tape proved to be too weak and the holes along the edges of less than ideal for achieving a tight cinch. Through experimentation, the ideal type of material as well as the design of teeth were determined. The unique strap ultimately proved to be highly adaptive to any use, as well as easy to lock and unlock for repeated use without any loss in effectiveness.

Figure 1:
FIGS. 1-6, labeled Prior Art, represent illustrations of currently available ties and fasteners.
Figure 2:
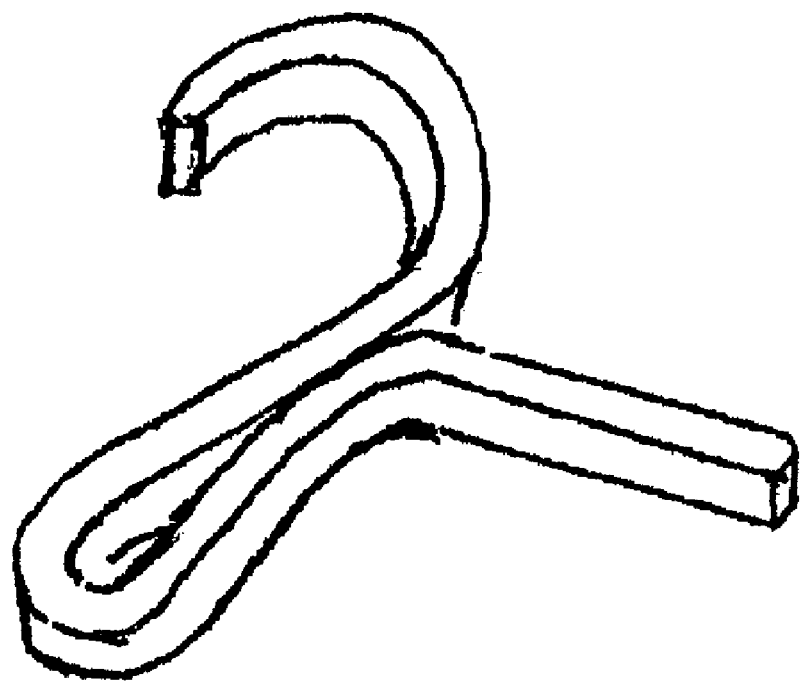
Figure 3:
Figure 4:
Figure 5:
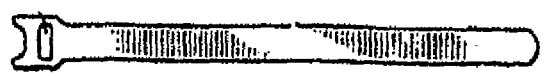
Figure 6:
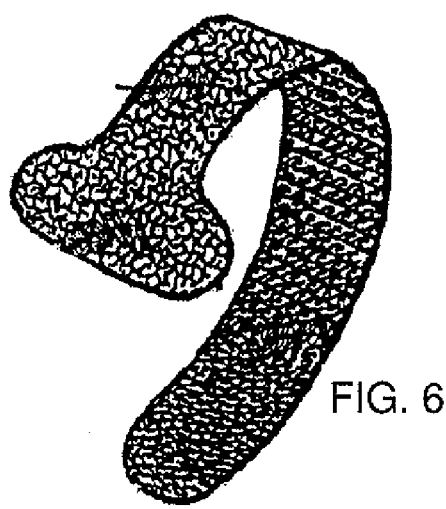

FIGS. 1-6 represent examples of currently generally available ties. FIG. 1 depicts the typical tie used with bread bags where the material to be cinched is pulled though the central opening and held tight by the two "teeth" found along the top side of such opening. Different in style but not purpose, FIG. 2 illustrates a tie where spring action holds the material cinched. FIGS. 3, 4 and 5 disclose typical strap like ties where one end of a strap is inserted through an opening, cinched, and then held in place through some form of an engaging means. FIG. 6 illustrates the use of Velcro® on a strap to maintain closure. There are disadvantages to each of the ties referred to above. Unlike the tie of the present invention, the tie of FIG. 1 is limited in its application to only those instances where material is of appropriate size to be pulled through the central opening. The tie disclosed in FIG. 2 differs from the present invention as it is limited in application to instances where material can be pulled through and employs a spring mechanism which over time can become weak and non-resilient. The ties in FIGS. 3, 4, and 5 require more complexity in manufacture than the present invention in that in each, a strap bearing a strategically placed opening and non-uniform width must be manufactured. FIG. 6 represents the most complex and expensive of the exemplary ties disclosed herein in that each strap must be covered with a hook and loop type material such as Velcro®.

Figure 7:
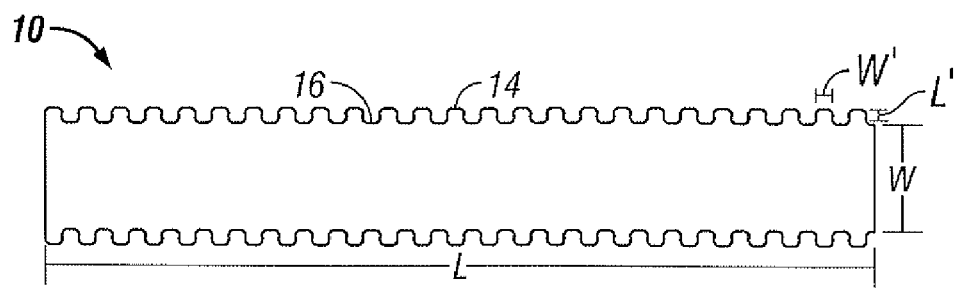
FIG. 7 shows a top view of the tie.
Figure 8:
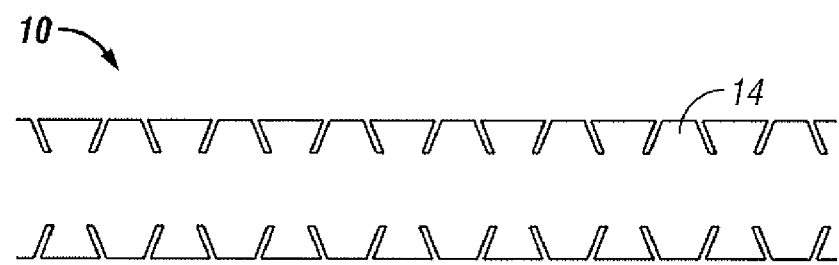
FIG. 8 shows a top view of an alternate embodiment of the tie.

The simplicity of the present invention is shown in FIG. 7. The tie 10 of the present invention consists of a planar, flat strap 12 having a length (l) and generally uniform width (w) made from any pliable semi-rigid material, such as polyethylene or polypropylene. The strap 12 also includes a first edge and a second edge. The thickness of the strap will vary depending on the material used for manufacture, though a thickness of less than some fraction of the width of the strap 12. Along most or the entire length of the two opposing edges of the strap are teeth 14 in a repeating and uniform pattern having a width (w') and a length (l'). The teeth 14 are generally formed during creating of the strap and therefore, are continuous with the strap. In one embodiment, the teeth 14 are separated by troughs 16 being inverse in shape to the teeth 14. An alternate embodiment lacks teeth 14 at the ends of the strap 12 in order to allow a more ergonomic and comfortable handle. FIG. 8 shows an alternate embodiment wherein said teeth 14 are formed by angled slits in the planar strap 12.

Figure 9:
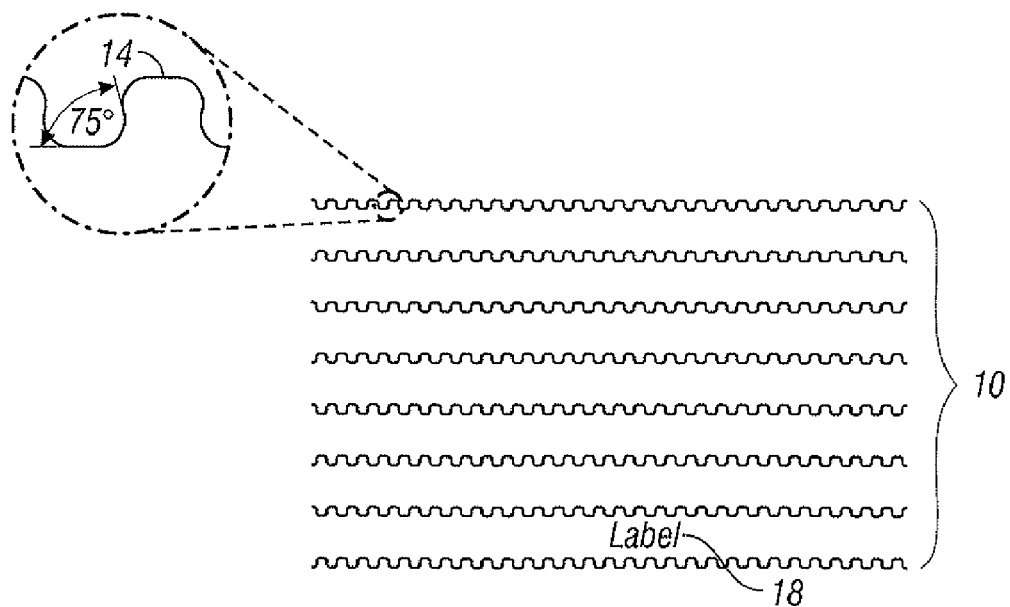
FIG. 9 shows multiple ties being cut from a single sheet of material and an enlargement showing the angle of taper of the tooth relative to the strap of the tie.

The shape of the teeth 14 allows multiple ties to be manufactured side-by-side from a single sheet of material without waste of material between ties, as illustrated in FIG. 9. Also, because the invention can be cut from a variety of smooth materials, as opposed to ridged or textured materials as required for the other tie-types shown in FIGS. 3-6, printing of an identifier 18, such as a part number or code, upon each individual tie can be easily accomplished. Additionally, because the ties can be manufactured without regard to a specific length (l), the end user can determine the desired length for each individual tie 10. FIG. 9 also shows an enlargement of a single tooth and an angle of taper from the top of the tooth to the strap 12 of 75 degrees which results in the most secure locking of teeth 14 when the tie 10 is engaged. The degree of taper can range from 70 degrees to 85 degrees. The teeth 14 can be of various shapes and sizes and still accomplish the desired cinching and locking of teeth 14. It has been determined that the tightest and most secure lock can be achieved if the width (w') of a tooth, at its widest point, is one fourth the width (w) of the strap, It has further been found that a tooth length (l') of one half the width (w) of the strap body achieves the most secure cinch. These attributes create a tie 10 that is easily scalable and therefore can be utilized in a wide variety of applications. A variety of manufacturing processes can be employed to produce the tie 10. One such process utilizes die cutting techniques to cut sheets of material into the ties 10. The ties can also be formed using molding or similar processes to form the strap 12 having teeth 14 as described above.

Figure 10:
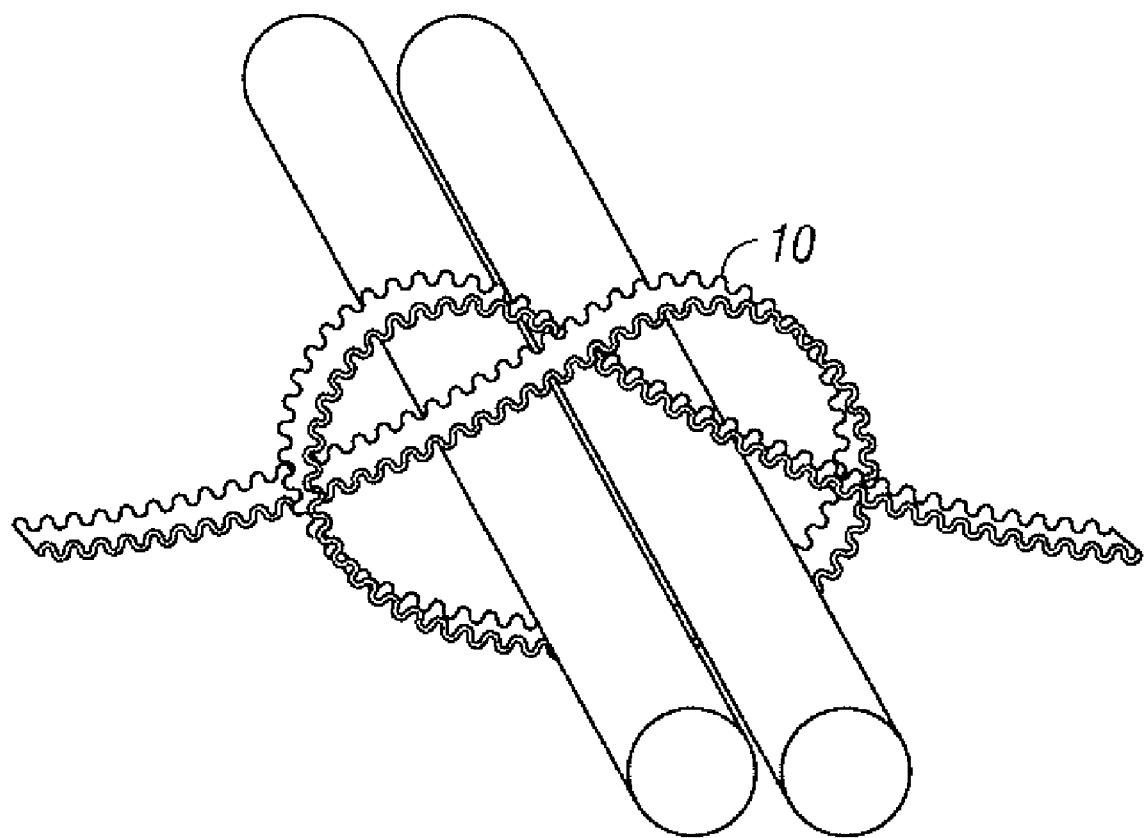
FIG. 10 illustrates how the tie functions to cinch and hold items.

FIG. 10 illustrates how the tie 10 functions to cinch and hold items. The tie 10 functions by interlocking of the teeth 14 when the strap 12 is tied in an overhand knot around an object or objects to be secured. The angle of taper of the teeth serves to prevent the teeth 14 from slipping past each other, thus creating a secure cinch. The tie 10 of the present invention can be cinched and un-cinched repeatedly without any loss in effectiveness. Release of the tie 10 is accomplished by pushing the ends towards each other in order to unlock the teeth 14 and allow for untying of the overhand knot.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method of cinching and bundling comprising the steps of:

wrapping a tie around at least one object;
tying said tie into an overhand knot, said tie comprising a planar strap having a first edge, a second edge and a plurality of teeth formed along both of said first and second edges such that said plurality of teeth interlock when said strap is tied.

2. The method of claim 1 wherein said teeth are tapered towards said strap at an angle between 70 degrees and 85 degrees.

3. The method of claim 1 wherein said teeth are tapered towards said strap at an angle of 75 degrees.

\* \* \* \* \*